(12) United States Patent
Kaufman et al.

(10) Patent No.: US 11,937,643 B2
(45) Date of Patent: *Mar. 26, 2024

(54) INDUCTIVE HEATING CIRCUIT FOR VOLATILIZING SMOKEABLE MATERIAL

(71) Applicant: NICOVENTURES TRADING LIMITED, London (GB)

(72) Inventors: Duane Kaufman, London (GB); Thomas P. Blandino, London (GB)

(73) Assignee: NICOVENTURES TRADING LIMITED, London (GB)

(*) Notice: Subject to any disclaimer, the term of this patent is extended or adjusted under 35 U.S.C. 154(b) by 0 days.

This patent is subject to a terminal disclaimer.

(21) Appl. No.: 17/930,451

(22) Filed: Sep. 8, 2022

(65) Prior Publication Data

US 2023/0141743 A1    May 11, 2023

Related U.S. Application Data

(63) Continuation of application No. 16/343,255, filed as application No. PCT/EP2017/076771 on Oct. 19, 2017, now Pat. No. 11,470,883.

(Continued)

(51) Int. Cl.
*A24F 13/00* (2006.01)
*A24B 15/167* (2020.01)
(Continued)

(52) U.S. Cl.
CPC .......... *A24F 40/465* (2020.01); *A24B 15/167* (2016.11); *A24F 40/50* (2020.01);
(Continued)

(58) Field of Classification Search
CPC ..................................................... A24F 47/00
(Continued)

(56) References Cited

U.S. PATENT DOCUMENTS 6,803,550 B2    10/2004   Sharpe et al.
7,070,743 B2    7/2006    Blackwell et al.
(Continued)

FOREIGN PATENT DOCUMENTS

CN    202818656 U    3/2013
CN    103053105 A    4/2013
(Continued)

OTHER PUBLICATIONS

Reason for Rejection received for Japanese Patent Application No. 2021-159773, dated Jan. 4, 2023, 2 pages (Official Copy Only).
(Continued)

*Primary Examiner* — Phuong K Dinh
(74) *Attorney, Agent, or Firm* — Husch Blackwell LLP (57) ABSTRACT

An inductive heating arrangement for heating smokable material includes a susceptor arrangement, at least first and second inductor coils and a control circuit. The first inductor coil generates a first varying magnetic field heating a first section of the susceptor arrangement and the second inductor coil generates a second varying magnetic field heating a second section of the susceptor arrangement. The control circuit is configured so that when one of the first and second coils is actively being driven to generate a varying magnetic field the other of the first and second inductor coils is inactive, and so that the inactive one of the first and second inductor coils is prevented from carrying a current induced by the active one of the first and second inductor coils sufficient to cause significant heating of the susceptor arrangement.

13 Claims, 6 Drawing Sheets

Related U.S. Application Data (60) Provisional application No. 62/410,056, filed on Oct. 19, 2016.

(51) Int. Cl.
*A24F 40/465* (2020.01)
*A24F 40/50* (2020.01)
*H05B 6/10* (2006.01)
*H05B 6/36* (2006.01)
*H05B 6/44* (2006.01)
*A24F 40/20* (2020.01)

(52) U.S. Cl.
CPC ............. *H05B 6/108* (2013.01); *H05B 6/365* (2013.01); *H05B 6/44* (2013.01); *A24F 40/20* (2020.01)

(58) Field of Classification Search
USPC .................................................. 131/328–329
See application file for complete search history.

(56) References Cited

U.S. PATENT DOCUMENTS

| | | | |
|---|---|---|---|
| 9,018,899 B2 | 4/2015 | Xiang | |
| 11,470,883 B2* | 10/2022 | Kaufman | ............... H05B 6/108 |
| 2004/0149737 A1 | 8/2004 | Sharpe et al. | |
| 2014/0209105 A1 | 7/2014 | Sears et al. | |
| 2015/0320116 A1 | 11/2015 | Bleloch et al. | |
| 2016/0089508 A1 | 3/2016 | Smith et al. | |

FOREIGN PATENT DOCUMENTS

| | | | |
|---|---|---|---|
| CN | 103653258 A | 3/2014 | |
| CN | 203952405 U | 11/2014 | |
| CN | 105852219 A | 8/2016 | |
| JP | H08511175 A | 11/1996 | |
| JP | 2004014487 A | 1/2004 | |
| JP | 2005173333 A | 6/2005 | |
| JP | 2008257246 A | 10/2008 | |
| JP | 2016524458 A | 8/2016 | |
| JP | 6768945 B2 | 9/2020 | |
| UA | 121893 C2 | 8/2020 | |
| WO | 2015177046 A1 | 11/2015 | |
| WO | 2017001818 A1 | 1/2017 | |
| WO | 2017068098 A1 | 4/2017 | |

OTHER PUBLICATIONS

Australian Examination Report for Application No. 2017347622 dated Jul. 24, 2019, 3 pages.
Extended European Search Report for Application No. 21192235.6, dated Dec. 13, 2021, 12 pages.
Extended European Search Report for Application No. EP21192236.4, dated Dec. 13, 2021, 9 pages.
International Preliminary Report on Patentability for Application No. PCT/EP2017/076771, dated May 2, 2019, 7 pages.
International Search Report for Application No. PCT/EP2017/076771, dated Feb. 16, 2018, 2 pages.
Notice Of Reasons for Refusal for Japanese Application No. 2020-158595 dated Jul. 13, 2021, 4 pages.
Office Action for Brazilian Application No. 112019008090-2 dated Sep. 28, 2021, 4 pages.
Office Action For Chinese Application No. 201780064241.4, dated Mar. 2, 2021, 16 pages.
Office Action for Malaysian Application No. PI2019001963, dated Aug. 19, 2022, 4 pages.
Office Action dated Sep. 13, 2021 for Ukraine Application No. 201904093, 5 pages.
Office Action dated Jun. 29, 2021 for Ukraine Application No. 201904093, 4 pages.
Written Opinion for Application No. PCT/EP2017/076771, dated Feb. 16, 2018, 5 pages.
Yanbo D., "Design and Implement on the Controlcircuit of Electromagneticinduction Heating," Mar. 15, 2016, vol. 03 China Master's Theses Full-text Database, Engineering Technology Series II, 80 pages.
"Notice of Reasons for Rejection received for Japanese Patent Application No. 2021-159773, dated Aug. 29, 2023", 6 pages (3 pages of English Translation and 3 pages of Official Copy).
"Office Action received for Brazilian Patent Application No. 112019008090-2, dated May 2, 2023", 9 pages (Official Copy Only).

* cited by examiner

INDUCTIVE HEATING CIRCUIT FOR VOLATILIZING SMOKEABLE MATERIAL

PRIORITY CLAIM

The present application is a Continuation of U.S. application Ser. No. 16/343,255, filed Apr. 18, 2019, which is a National Phase entry of PCT Application No. PCT/EP2017/076771, filed Oct. 19, 2017, which claims priority from U.S. Provisional Application No. 62/410,056, filed Oct. 19, 2016, each of which is hereby fully incorporated herein by reference.

TECHNICAL FIELD

The present disclosure relates to an inductive heating arrangement.

BACKGROUND

Articles such as cigarettes, cigars and the like burn tobacco during use to create tobacco smoke. Attempts have been made to provide alternatives to these articles, which articles burn tobacco, by creating products that release compounds without burning. Examples of such products are so-called heat-not-burn products, also known as tobacco heating products or tobacco heating devices, which release compounds by heating, but not burning, the material. The material may be for example tobacco or other non-tobacco products or a combination, such as a blended mix, which may or may not contain nicotine.

SUMMARY

According to a first aspect of the present disclosure there is provided an inductive heating arrangement for use with a device for heating smokable material to volatilize at least one component of said smokable material, the inductive heating arrangement comprising; a susceptor arrangement that is heatable by penetration with a varying magnetic field to heat the smokable material; at least a first inductor coil and a second inductor coil, the first inductor coil for generating a first varying magnetic field for heating a first section of the susceptor arrangement and the second inductor coil for generating a second varying magnetic field for heating a second section of the susceptor arrangement; a control circuit for controlling the first inductor coil and the second inductor coil, wherein, the control circuit is configured so that when one of the first and second coils is actively being driven to generate a varying magnetic field the other of the first and second inductor coils is inactive and wherein the control circuit is configured so that the inactive one of the first and second inductor coils is prevented from carrying a current induced by the active one of the first and second inductor coils sufficient to cause significant heating of the susceptor arrangement.

According to a second aspect of the present disclosure there is provided an aerosol provision device for providing an inhalable aerosol, the device comprising: the heating arrangement according to the first aspect.

BRIEF DESCRIPTION OF THE DRAWINGS

Embodiments of the disclosure will now be described, by way of example only, with reference to the accompanying drawings, in which.

DETAILED DESCRIPTION

As used herein, the term "smokable material" includes materials that provide volatilized components upon heating, typically in the form of an aerosol. "Smokable material" includes any tobacco-containing material and may, for example, include one or more of tobacco, tobacco derivatives, expanded tobacco, reconstituted tobacco or tobacco substitutes. "Smokable material" also may include other, non-tobacco, products, which, depending on the product, may or may not contain nicotine. "Smokable material" may for example be in the form of a solid, a liquid, a gel or a wax or the like. "Smokable material" may for example also be a combination or a blend of materials.

Apparatus is known that heats smokable material to volatilize at least one component of the smokable material, typically to form an aerosol which can be inhaled, without burning or combusting the smokable material. Such apparatus is sometimes described as a "heat-not-burn" apparatus or a "tobacco heating product" or "tobacco heating device" or similar. Similarly, there are also so-called e-cigarette devices, which typically vaporize a smokable material in the form of a liquid, which may or may not contain nicotine. The smokable material may be in the form of or be provided as part of a rod, cartridge or cassette or the like which can be inserted into the apparatus. A heater for heating and volatilizing the smokable material may be provided as a "permanent" part of the apparatus or may be provided as part of the smoking article or consumable which is discarded and replaced after use. A "smoking article" in this context is a device or article or other component that includes or contains in use the smokable material, which is heated to volatilize the smokable material, and optionally other components in use.

Figure 1:
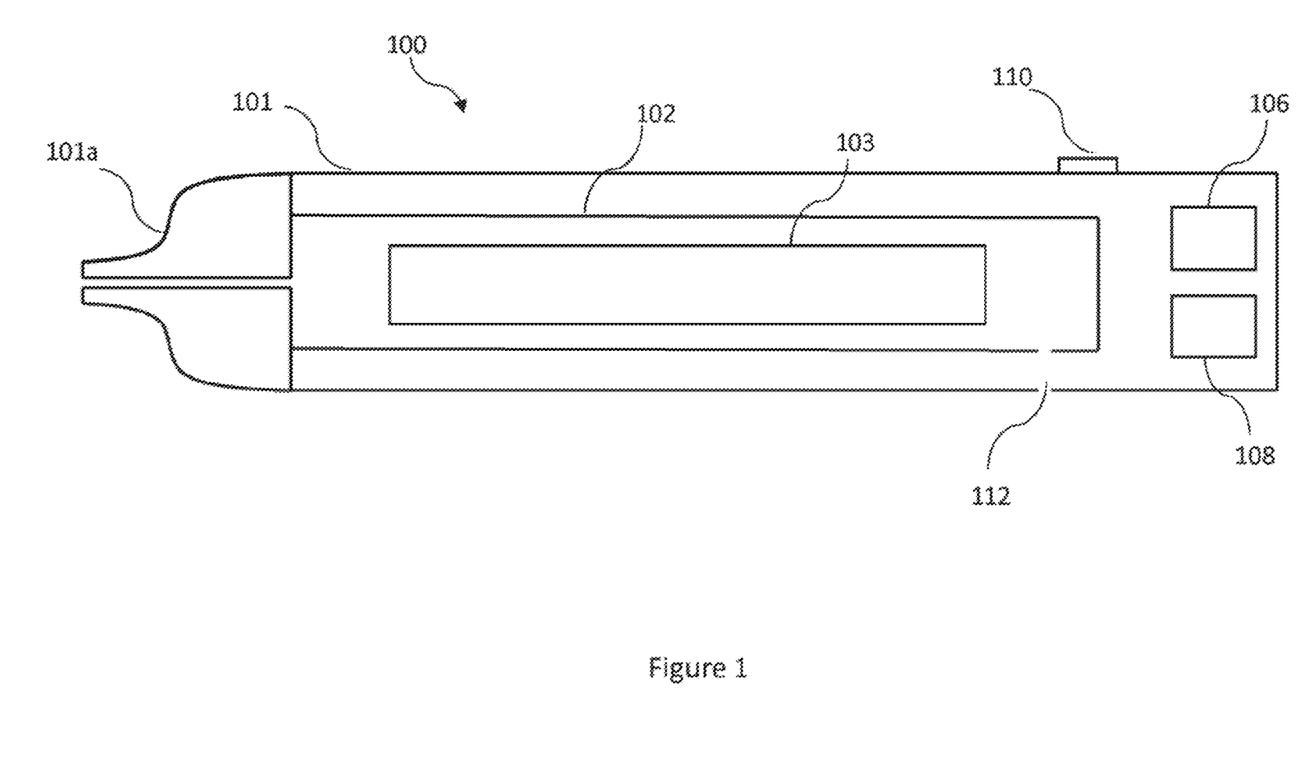
FIG. 1 illustrates schematically an apparatus arranged to heat smokable material.

Referring to FIG. 1, an apparatus 100 arranged to heat smokable material is shown. The apparatus 100 can be used to heat smokable material (not shown in FIG. 1) to volatilize at least one component of the smokable material. In this example, the apparatus 100 comprises an elongate outer housing 101. The apparatus 100 may comprise any suitable material or materials, for example, the outer housing 101 may comprise plastic or metal. The apparatus 100 has a mouthpiece 101a through which a user can draw a material that has been volatilized in the apparatus 100.

The apparatus 100 has a heating chamber 102 that contains a heating arrangement 103 for heating the smokable material (not shown). The heating chamber 102 is in fluid flow communication with the mouthpiece 101a.

The apparatus 100 further comprises a controller 106 and a DC power source 108. The controller 106 may comprise control circuitry and a micro-processor arrangement configured and arranged to control the heating arrangement 103 as discussed further below.

The power source 108 may be a battery, which may be a rechargeable battery or a non-rechargeable battery. Examples include nickel cadmium batteries, although any suitable batteries may be used. The power source 108 is electrically coupled to the heating arrangement 103 to supply electrical power when required and under control of the controller 106 to heat the smokable material (as discussed, to volatize the aerosol generating material without causing it to combust or undergo pyrolysis).

The apparatus 100 may further comprise an actuator 110, for example, a user operable push button 110 on the exterior of the housing 101 and coupled to the controller 106.

The apparatus 100 may further comprise one or more air inlets 112 formed through the housing 101 and into the heating chamber 102.

In use, heat produced by the heating arrangement 103 heats the smokable material in the heating chamber 102 to generate aerosol and/or a gas or vapor. As a user inhales on the mouthpiece 101a air is drawn into the heating chamber 102 through the one or more air inlets 112 and the combination of the drawn air and aerosol and/or gas vapor passes into the mouthpiece 101a for inhalation by a user.

Figure 2:
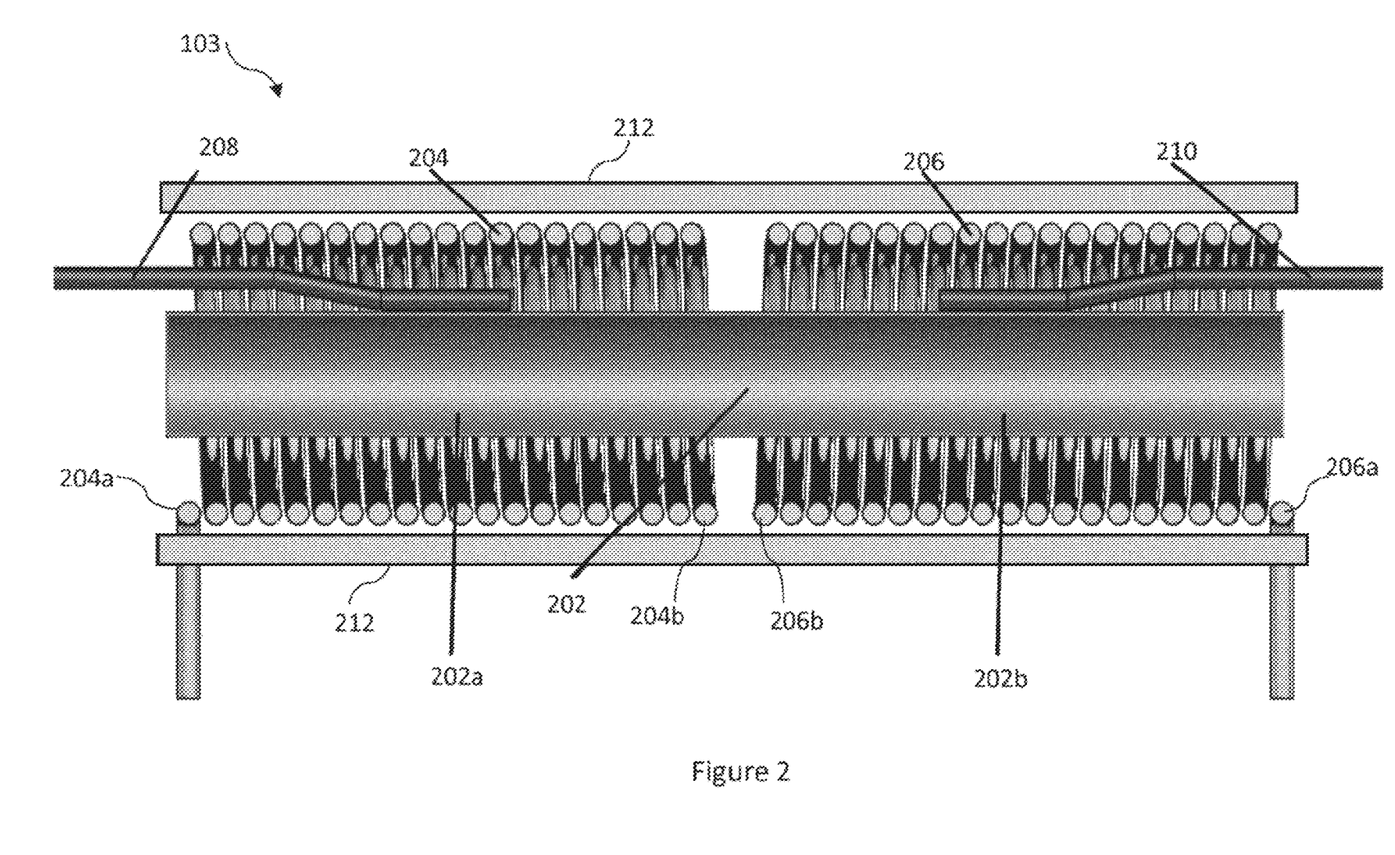
FIG. 2 illustrates a cross sectional view of a heating arrangement for the apparatus of FIG. 1.

Referring now to FIG. 2, there will be described an example of the heating arrangement 103 in which example the heating arrangement 103 is an inductive heating arrangement that provides heat by inductive heating.

The heating arrangement 103 comprises a susceptor 202. The susceptor 202 comprises a first susceptor region 202a and a second susceptor region 202b. In this example, the susceptor 202 is a single tubular member made from a material that can be inductively heated, (i.e. the susceptor 202 generates heat when in the vicinity of a varying magnetic field). In some examples, the susceptor 202 may have a cross-sectional shape other than circular, for example, square, rectangular, triangular or any other suitable shape. In some examples, the susceptor 202 may not be tubular and could be a blade susceptor. In some examples, the susceptor 202 may comprise a magnetically permeable material. A varying magnetic field generates eddy currents in the susceptor 202, which eddy currents flow against the electrical resistance of the susceptor 202 to generate heat. In some examples, the susceptor 202 may be made from iron, steel, aluminum or the like.

In examples in which the susceptor 202 is composed of a magnetic material, a varying magnetic field additionally causes heating due to the well-known hysteresis effect.

The heating arrangement 103 also comprises first and second inductor coils 204,206, respectively. The first and second inductor coils 204,206 are made from an electrically conducting material. In one example, the first and second inductor coils 204,206 are made from copper. In another example, the first and second inductor coils 204,206 are made from copper Litz wire, specifically. In this example, the first and second inductor coils 204,206 are wound in a helical fashion around a central longitudinal axis of the susceptor 202. The first and second inductor coils 204,206, in this example, are wound co-axially around the susceptor 202, that is, the central longitudinal axes of the wound first and second inductor coils 204,206 and the central longitudinal axis of the susceptor 202 coincide. In this example, the first and second inductor coils 204,206 wound around the tubular susceptor 202 also have a tubular shape. In other examples, where the susceptor 202 is of a different cross-sectional shape, the first and second inductor coils 204,206 wound around the susceptor 202 may have the same cross-sectional shape as the susceptor 202. The first inductor coil 204 comprises a first end 204a and a second end 204b and the second inductor coil 206 comprises a first end 206a and a second end 206b. The first end 204a of the first inductor coil 204 is closer to an end of the susceptor 202 corresponding to the first susceptor region 202a than it is to the centre of the susceptor 202, and the second end 204b of the first inductor coil 204 is closer to the centre of the susceptor 202 than it is to the end of the susceptor 202 corresponding to the first susceptor region 202a. On the other hand, the first end 206a of the second inductor coil 206 is closer to an end of the susceptor 202 corresponding to the second susceptor region 202b than it is to the centre of the susceptor 202, and the second end 206b of the second inductor coil 206 is closer to the centre of the susceptor 202 than it is to the end of the susceptor 202 corresponding to the second susceptor region 202b.

In the example of FIG. 2, the first and second inductor coils 204,206 generate a varying magnetic field when a varying electrical current flows through them. In this example, when a varying current flows through the first inductor coil 204, it generates a corresponding varying magnetic field, which field causes only the part of the susceptor 202 substantially closest to the first inductor coil 204 to generate heat. In other words, the varying magnetic field generated by the first inductor coil 204 causes substantially localized heating in the first susceptor region 202a of the susceptor 202. Similarly, when a varying current flows through the second inductor coil 206, it generates a corresponding varying magnetic field, which field causes only the part of the susceptor 202 substantially closest to the second inductor coil 206 to generate heat. In other words, the varying magnetic field generated by the second inductor coil 206 causes substantially localized heating in the second susceptor region 202b of the susceptor 202. Thus, the first and second inductor coils 204,206 can be operated to heat substantially the entire length of the susceptor 202. More specifically, the first inductor coil 204 can be operated to heat the first susceptor region 202a and the second inductor coil 206 can be operated to heat the second susceptor region 202b.

In one example, one of the inductor coils may be operated for an extended period of time in order to substantially locally heat its respective susceptor region. In some examples, the inductor coils 204,206 may be operated alternatively, each inductor coil being operated for a respective given interval of time while the other inductor coil is not operated. The given intervals of time for each inductor coil may be such that substantially the entire length of the susceptor 202 is evenly heated, or they may be such that the susceptor 202 is un-evenly heated. In examples of the apparatus 100, smokable material can be placed in the volume within the tubular susceptor 202. In some examples, the smokable material may be contained in a smokable material wrapper or container (not shown), which container can be inserted into the volume within the tubular susceptor 202. The smokable material container may be composed of a material that allows a desired amount of heat from the susceptor 202 to reach the smokable material in order to heat it. In another example, the smokable material may be formed into a long string or a rope like element, which can be inserted into the volume within the tubular susceptor 202. In another example, the smokable material may be in the form of pellets or tablets of smokable material that can be inserted into the volume within the tubular susceptor 202. In examples of the apparatus 100, suitable means for directing air through the tubular susceptor 202 may be included.

In examples of the heating arrangement 103, the heat generated by the susceptor 202 heats the smokable material to volatilize at least one component of the smokable material. Since the heating of the susceptor 202 can be localized, the smokable material can be heated in a localized fashion. For example, if the first susceptor region 202a is heated, only the smokable material within the volume of the first susceptor region 202a can be expected to be heated. Similarly, if the second susceptor region 202b is heated, only the smokable material within the volume of the second susceptor region 202b can be expected to be heated.

In this example, the heating arrangement 103 further comprises first and second temperature sensing elements 208,210, respectively. The first temperature sensing element 208 is placed in contact with the susceptor 202 at a position substantially near the middle of the first inductor coil 204, that is, in the middle of the first susceptor region 202a as shown in FIG. 2. Similarly, the second temperature sensing element 210 is placed in contact with the susceptor 202 at a position substantially near the middle of the second inductor coil 206, that is, in the middle of the second susceptor region 202b as shown in FIG. 2. Accordingly, the temperature sensing element 208 detects the temperature of the susceptor 202 in the middle of the first susceptor region 202a, and the temperature sensing element 210 detects the temperature of the susceptor 202 in the middle of the second susceptor region 202b. In other examples, a number of temperature sensing elements other than two may be used. In other examples, temperature sensing elements may be positioned differently.

In the example of FIG. 2, the heating arrangement 103 also comprises a magnetic conductor 212 surrounding the first and second inductor coils 204,206. In this example, the magnetic conductor 212 is a tubular member arranged co-axially with respect to the first and second inductor coils 204,206. The magnetic conductor 212 is made from a high permeability and low-loss material, and acts to substantially confine the magnetic field generated by the first and second inductor coils 204,206 within the volume enclosed by the magnetic conductor 212. In some examples, a magnetic conductor may surround only one of the first and second inductor coils 204,206, for example the coil nearest the mouth end of the apparatus 100. In some examples, a first magnetic conductor may surround the first inductor coil 204 and a second magnetic conductor may surround the second inductor coil 206, with the first and second magnetic conductors having a gap between them. In other examples, the heating arrangement 103 may not comprise any such magnetic conductor.

In this example, the controller 106 is configured to control the heating arrangement 103. The controller 106 comprises circuitry that controls the operation of the first and second inductor coils 204,206 in order to control the heating arrangement 103.

Figure 3:
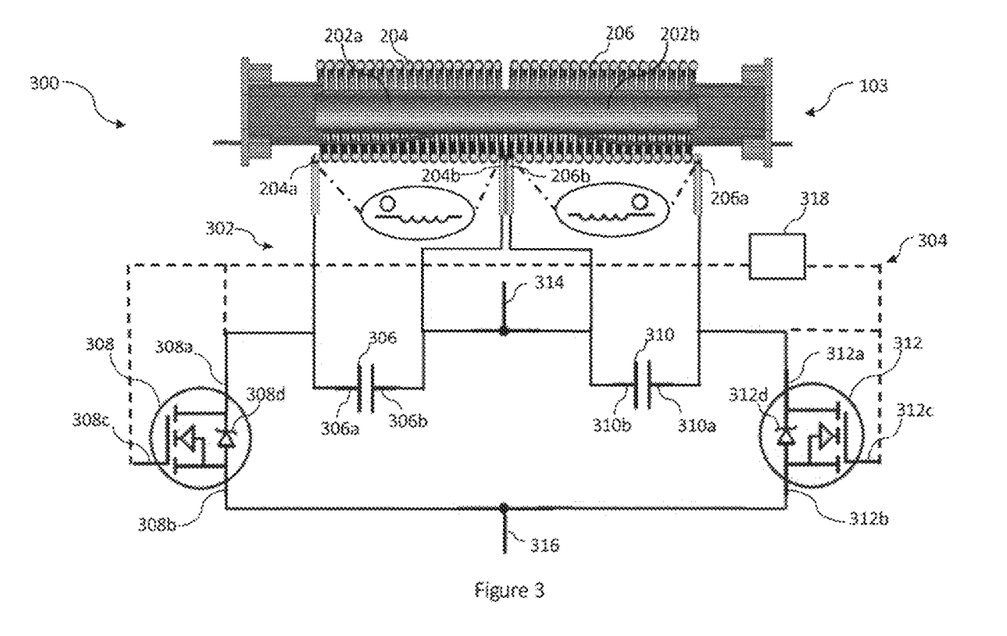
FIG. 3 is a diagram of a first circuit for controlling the heating arrangement of FIG. 2.

Referring now to FIG. 3, there is illustrated an example of a circuit comprised in the controller 106. In this example, the circuit 300 is configured to control current flow through the first and second inductor coils 204,206 which are connected in the circuit 300 as shown in FIG. 3. The circuit 300 is configured to control both the first and second inductor coils 204,206 such that only one of the first and second inductor coils 204,206 operates to significantly heat its respective susceptor region 202a, 202b at a given time. In other words, the topology of circuit 300 allows the same circuitry to be used to operate two separate inductor coils at different times to heat the susceptor 202.

It will be understood that when the first inductor coil 204 is being controlled to generate a varying magnetic field, a voltage will be induced in the second inductor coil 206 and vice versa. However in this example, the topology of the circuit 300 is such that when one of the inductor coils is controlled to generate a varying magnetic field, that is, to heat the susceptor 202, an induced current sufficient to cause significant heating of the susceptor 202 is prevented from flowing in the other inductor coil. More specifically, when the first inductor coil 204 is being operated, current sufficient to cause significant heating of the susceptor 202 is prevented from flowing in the second inductor coil 206, and when the second inductor coil 206 is being operated, current sufficient to cause significant heating of the susceptor 202 is prevented from flowing in the first inductor coil 204. In general, in examples of the apparatus 100, the controller 106 comprises circuitry arranged such that when one of the inductor coils 204, 206 is being operated to heat the susceptor 202, a current sufficient to cause significant heating of the susceptor 202 is prevented from flowing in the other inductor coil 204, 206. Thus, when one of the inductor coils is being operated to heat the susceptor 202, the other inductor coil is prevented from significantly heating the susceptor 202. As a result, since the first and second inductor coils 204 and 206 operate to substantially locally heat susceptor regions 202a and 202b respectively, localized heating of the susceptor 202 can be achieved.

In the example of FIG. 3, the circuit 300 includes first and second resonator sections 302 and 304. The first inductor coil 204 is arranged to form part of the first resonator section 302 of the circuit 300, and the second inductor coil 206 is arranged to form part of the second resonator section 304 of the circuit 300. The first resonator section 302 also comprises a first capacitor 306 comprising a first terminal 306a and a second terminal 306b, and a first switch 308. Similarly, the second resonator section 304 further comprises a second capacitor 310 comprising a first terminal 310a and a second terminal 310b, and a second switch 312. The first switch 308 is arranged to turn the first resonator section 302 on and off, and the second switch 312 is arranged to turn the second resonator section 304 on and off. In some examples, the components of circuit 300 may be arranged differently (in a different topography) to as shown in FIG. 3. In some examples, additional or alternative components may be included.

In this example, the first and second switches 308 and 312 of the circuit 300 are field effect transistors (FETs). More specifically, in this particular example, the first and second FETs 308 and 312 are N-channel FETs. As will be appreciated by those skilled in the art, the first FET 308 comprises a drain terminal 308a, a source terminal 308b and a gate terminal 308c and the second FET 312 comprises a drain terminal 312a, a source terminal 312b and a gate terminal 312c.

The first and second resonator sections 302 and 304, in this particular example, are LC (inductor/capacitor) resonator sections. In other words, each resonator section 302, 304 is equivalent to an LC resonator circuit.

A power supply connection 314 connects the second end 204b of the first coil 204, the second terminal 306b of the first capacitor 306, the second end 206b of the second coil 206 and the second terminal 310b of the second capacitor 310 to the positive terminal of the (DC) power source 108 (not illustrated in FIG. 3). The first end 204a of the first inductor coil 204 and the first terminal 306a of the first capacitor 306a are connected to the drain terminal 308a of the first FET 308 and, likewise, the first end 206a of the second inductor coil 206 and the first terminal 310a of the second capacitor 310 are connected to the drain terminal 312a of the second FET 312. A negative terminal connection 316 connects the source terminal 308b of the first FET 308 and the source terminal 312b of the second FET 312 to the negative terminal of the power source 108.

As will be well understood by those skilled in the art, an N-channel FET is in an 'ON' state when an appropriate control voltage is applied to its gate so that a conductive path exists between its drain and source. However, as will also be well understood by those skilled in the art, when an N-channel FET is in an 'OFF' state (i.e. when the appropriate control voltage is not applied to its gate) it effectively acts as a diode. In FIG. 3, the diode functionality that the first FET 308 exhibits when in its OFF state is represented by a first diode 308d and the diode functionality that the second FET 312 exhibits when in its OFF state is represented by a second diode 312d. The first diode 308d has its cathode connected to the first end 204a of the first inductor coil 204 and the first terminal 306a of the first capacitor 306, and its anode connected to the negative terminal connection 316, and the second diode 312d has its cathode connected to the first end 206a of the second inductor coil 206 and the first terminal 310a of the first capacitor 310, and its anode connected to the negative terminal connection 316.

In this example, having regard to the first and second FETs 308 and 312, and the topology of the circuit 300, the phasing of the first and second inductor coils 204 and 206 with respect to each other is chosen such that when the first inductor coil 204 is being operated, current sufficient to cause significant heating of the susceptor 202 is prevented from flowing in the second inductor coil 206, and when the second inductor coil 206 is being operated, current sufficient to cause significant heating of the susceptor 202 is prevented from flowing in the first inductor coil 204.

In this example, one of the first 204 and second 206 inductor coils is controlled to heat the susceptor by having its corresponding first 308 or second 312 switch (as the case may be) being repeatedly turned on and off at a fast switching rate while the other one of the first 204 and second 206 inductor coils remains inactive and its corresponding first 308 or second 312 switch (as the case may be) remains off. More specifically, the first inductor coil 204 is controlled to heat the susceptor 202 when the first switch 308 is turned on and off at a first switching rate while the second switch 312 remains off, and the second inductor coil 206 is controlled to heat the susceptor 202 when the second switch 312 is turned on and off at a second switching rate while the first switch 308 remains off. A controller 318 is provided in the circuit 300 to control the switching on and off of whichever of the first 308 and second 312 FETs is being operated. The first and second switching rates may be different or the same.

The operation of the first 204 and second 206 inductor coils during this fast switching is explained in more detail below.

The functioning of the example circuit 300 will now be described in more detail in the context of the first inductor coil 204 being operated to heat the susceptor 202 when the first FET 308 is being rapidly turned on and off by the controller 318.

When the first FET 308 is on, a DC current flows between the power supply connection 314 and the negative terminal connection 316, and through the first inductor coil 204. This DC current is driven by the power supply 108. It will be understood that when a current flows through the first inductor coil 204, the first inductor coil 204 generates a magnetic field as a result of the current. The first inductor coil 204 stores energy in the magnetic field it generates. When the first FET 308 is on, the voltage across the first FET 308 is zero. The first capacitor 306 is short circuited by the first FET 308 being on. In other words, when the first FET 308 is on, current between the power supply connection 314 and the negative terminal connection 316 flows through the first FET 308.

After the first inductor 204 has been allowed to generate a magnetic field due to the first FET 308 being on for a given amount of time and the first FET 308 is subsequently turned off, the current driven by the power supply 108 through the first inductor coil 204 begins to drop off. The first inductor coil 204 resists this change in current and generates an induced voltage using the energy that was stored in the magnetic field generated by the first inductor coil 204 when the first FET 308 was on and a direct current was flowing through the first inductor coil 204. Accordingly, when the first FET 308 is turned off after being on, the first capacitor 306 and the first inductor coil 204 resonate with each other.

Figure 4:
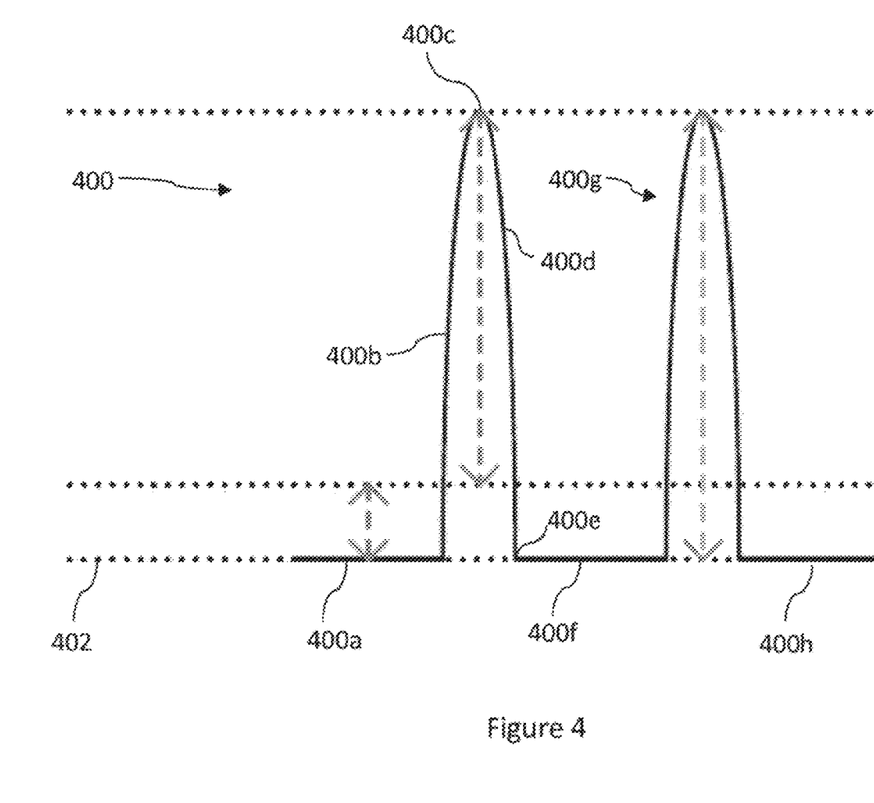
FIG. 4 is a trace of voltage as a function of time across a component of the first circuit of FIG. 3.

FIG. 4 shows the voltage across the first FET 308, as indicated by a voltage trace 400, when the first FET 308 is turned off and on twice during a time period that the first inductor 204 is being operated to heat the susceptor 202.

The voltage trace 400 comprises a first section 400a when the first FET 308 is on, a second section 400b to 400d when the first FET 308 is switched off, a third section 400f when the first FET 308 is switched on again, a fourth section 400g when the first FET 308 is switched off again and a fifth section 400h when the first FET 308 is subsequently switched on again.

The voltage across the first FET 308 is zero when the first FET 308 is on in sections 400a, 400f and 400h.

When the first FET 308 is turned off as indicated by section 400b to 400d and also by section 400g, the first inductor coil 204 uses the energy stored in its magnetic field (which magnetic field was the result of a current flow when the first FET 308 was on) to induce a voltage that resists a drop in the current flowing through the first inductor coil 204 as a result of the first FET 308 being off. The voltage induced in the first inductor coil 204 causes a corresponding variation in voltage across the first FET 308. During this variation in voltage, the first inductor coil 204 and the first capacitor 306 resonate with each other. The voltage 400 initially increases (see for example 400b) as the induced voltage in the first inductor coil 204 increases to oppose a drop in current due to the first FET 308 being off, reaches a peak (see for example 400c) and then, as the energy stored in the magnetic field of the first inductor coil 204 diminishes, decreases back to zero (see for example 400d).

The varying voltage 400b to 400d and 400g produces a corresponding varying current and, since during the off time of the first FET 308, the first capacitor 306 and the first inductor 204 act as a resonant LC circuit, the total impedance of the first resonant section 302 is at a minimum during this time. It will therefore be understood that the maximum magnitude of the varying current flowing through the first resonant section 302 will be relatively large.

This relatively large varying current accordingly causes a relatively large varying magnetic field in the first inductor 204 which causes the susceptor 202 to generate heat. The time period over which the voltage across the first FET 308 varies as indicated by section 400b to d and by section 400g in this example depends on the resonant frequency of the first resonant section 302. As will be appreciated by those skilled in the art, the resonant frequency of the first resonant section 302 depends on the inductance of the first inductor coil 204 and the capacitance of the first capacitor 306.

Referring again to FIG. 4, when the first FET 308 is off and the voltage across the first FET 308 subsequently decreases back towards 0V (e.g. the voltage is substantially at level 402 at point 400e), the controller 318 turns the first FET 308 back on so that a dc current driven by the power supply 108 flows again through the first inductor coil 204, and the first inductor coil 204 can store energy in the form of a magnetic field for the next time the first FET 308 is switched off to turn the resonant section 302 on as indicated by section 400g.

The time for which the controller 318 keeps the first FET 308 on (e.g. part 400f) may be selected in accordance with the amount of energy that is desired to be stored in the first inductor coil 204, a part of which energy will be used to heat the susceptor 202 during the next off time of the first FET 308 as indicated by 400g (on time of the resonant part 202). The amount of energy that may be stored in the first inductor coil 204 for a given on time 400f of the first FET 308 will depend on such factors as the voltage provided by the power supply 108 and the number of turns on the first inductor coil 204, for example. It will be understood that in this example, when the voltage across the first FET 308 reaches 0V, the voltage at the drain 308a of the first FET 308 also reaches 0V.

As the controller 318 repeatedly switches first FET 308 on and off in this way at a switching rate, the above described process is continuously repeated to heat the susceptor 202.

Although the above description of the functioning of the circuit 300 is presented in the context of the first inductor coil 204 being operated to heat the susceptor 202, it will be understood that the second inductor coil 206 forming part of the second resonator section 304 will be operated in substantially the same way, with the second FET 312 performing functions equivalent to the first FET 308 and the second capacitor 310 performing functions equivalent to the first capacitor 306.

As previously mentioned above, the circuit 300 allows the first and second inductor coils 204,206 to be operated such that only one of the first and second coils 204 and 206 operates to significantly heat the susceptor 202 at a given time. This is achieved firstly by switching, at a given switching rate, one of the first or second FETs 308 or 312 while the other FET remains off.

Secondly, when one of the first 204 and second 206 inductor coils is being operated to heat the susceptor 202 (as is described above with respect to the first coil 204), the circuit 300 is specifically configured so that a voltage that is induced in the other non-operating coil by the varying magnetic field of the operating coil does not cause a significant current to flow through the non-operating coil which itself would cause a varying magnetic field which could heat the susceptor. More specifically, when the first inductor coil 204 is being operated to heat the susceptor 202, a current sufficient to cause significant heating of the susceptor 202 is prevented from flowing through the second inductor coil 206, and when the second inductor coil 206 is being operated to heat the susceptor 202, a current sufficient to cause significant heating of the susceptor 202 is prevented from flowing through the first inductor coil 204.

This is necessary because, as mentioned above, the first 308 and second 312 FETs effectively act as diodes when switched off and so may conduct a current if they are forward biased (i.e. the FETs are not perfect switches). Accordingly, it is important that the circuit 300 is configured so that when one of the first 204 and 206 inductor coils is being operated to heat the susceptor 202, the voltage induced across the other non-operative inductor coil does not forward bias the intrinsic diode of the FET associated with that non-operative inductor coil but instead reverse biases it.

It will be understood by those skilled in the art that when considering two inductors which are magnetically coupled, their winding relative to each other determines in which direction the varying magnetic field generated by one inductor drives a current/induces a voltage in the other inductor.

The direction in which current is driven/voltage is induced in a coil can be determined by applying the well-known "right hand rule" relating direction of current to the direction of a magnetic field. The relative winding of the first and second inductor coils 204 and 206 may be referred to as the phasing of the first and second inductor coils 204 and 206.

In the topology of the circuit 300 in FIG. 3 the first inductor coil 204 and the second inductor coil 206 are wound in opposite senses as indicated by the dots which appears at the first end 204a of the first inductor coil 204 and at the first end 206a of the second coil 206. An example of the heating arrangement 103 is also shown connected to the circuit 300 to illustrate that the first and second inductor coils 204,206 are physically wound in opposite directions in this example.

Accordingly, when, for example, the controller 318 is repeatedly switching on and off the first FET 308 (as described above) in order to cause the first inductor coil 204 to heat the susceptor 202, each time the first FET 308 is switched off, a positive voltage is generated at the first end 204a of the first inductor coil 204 and a corresponding smaller positive voltage is induced at the first end 206a of the second inductor coil 206 due to magnetic coupling. This results in the intrinsic diode of the second FET 312 being reverse biased and hence current is substantially prevented from flowing through the second FET 312. Although some current may flow between the second inductor coil 206 and second capacitor 310, a current sufficient to generate a varying magnetic field strong enough to significantly heat the susceptor 202 is prevented from flowing through the second inductor coil 206 due to the second FET 312 being reverse biased. Also, as a result of the second FET 312 being reverse biased and a current being prevented from flowing through it when the first FET 308 is repeatedly being switched on and off and the second FET 312 remains off, a significant amount of energy is prevented from building up in the second inductor coil 206 so that a significant amount of energy is not drawn away from the first inductor coil 204 being operated to heat the susceptor 202.

Similarly, when, for example, the controller 318 is repeatedly switching on and off the second FET 312 in order to cause the second inductor coil 206 to heat the susceptor 202, each time the second FET 312 is switched off, a positive voltage is generated at the first end 206a of the second inductor coil 206 and a corresponding smaller positive voltage is induced at the first end 204a of the first inductor coil 204 due to magnetic coupling. This results in the intrinsic diode of the first FET 308 being reverse biased and hence current is substantially prevented from flowing in the first FET 308. Although some current may flow between the first inductor coil 204 and first capacitor 306, a current sufficient to generate a varying magnetic field strong enough to significantly heat the susceptor 202 is prevented from flowing through the first inductor coil 204 due to the first FET 308 being reverse biased. Also, as a result of the first FET 308 being reverse biased and a current being prevented from flowing through it when the second FET 312 is repeatedly being switched on and off and the first FET 308 remains off, a significant amount of energy is prevented from building up in the first inductor coil 204 so that a significant amount of energy is not drawn away from the second inductor coil 206 being operated to heat the susceptor 202.

Thus, preventing a current sufficient to significantly heat the susceptor from flowing in the non-operating inductor coil in this way provides the additional advantage of preventing the non-operating inductor coil from taking a significant amount of energy away from the operating coil in order to generate its own magnetic field, which energy is used to generate a varying current and therefore magnetic field by the operating coil in order to heat the susceptor 202.

Figure 5:
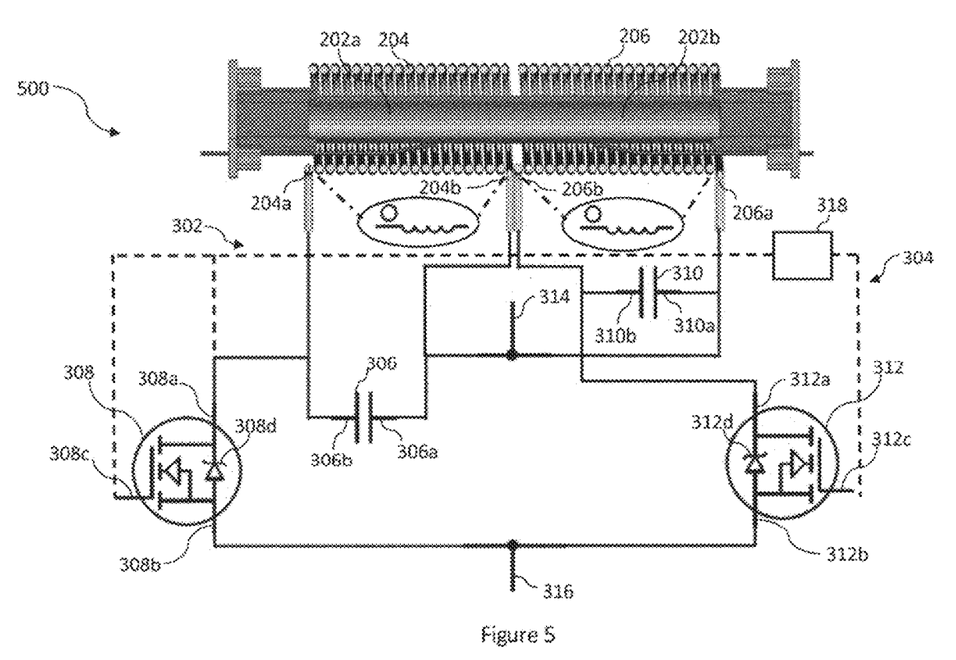
FIG. 5 is a diagram of a second alternative circuit for controlling the heating arrangement of FIG. 2.

Referring now to FIG. 5, there is illustrated a second circuit 500 configured to control the first and second inductor coils 204 and 206 comprised in the controller 106.

Many of the components of the circuit 500 are identical to corresponding components in the circuit 300 and function in an identical way. These components have been given the same reference numerals as they have in FIG. 3 and in the interests of brevity will not be described in detail again. In some examples, the components of circuit 500 may be arranged differently (in a different topography) to as shown in FIG. 5. In some examples, additional or alternative components may be included.

In this example, the circuit 500 is used to control a heating arrangement in which both the first and second inductor coils 204,206 are wound in the same direction relative to each other (have the same phasing) as indicated by the dots which appears at the first end 204a of the first inductor coil 204 and at the second end 206b of the second coil 206. An example of the heating arrangement 103 is shown connected to the circuit 500 to illustrate that the first and second inductor coils 204,206 are physically wound in the same direction in this example. One difference in the circuit topology of the circuit 500 compared with the circuit 300 is the configuration of the wiring connecting the second inductor coil 206 to the rest of the circuit. As mentioned above, in circuit 300, the second end 206b of the second coil 206 connects to the positive terminal of the power source 108 via the power supply connection 314, and the first end 206a of the second coil 206 connects to the drain terminal 312a of the second FET 312. In contrast, in circuit 500, the first end 206a of the second coil 206 connects to the positive terminal of the power source 108 via the power supply connection 314, and the second end 206b of the second coil 206 connects to the drain terminal 312a of the second FET 312.

Although, in this example, the inductor coils 204,206 are wound in the same direction, the topology of circuit 500 is such that when the first inductor coil 204 is being operated, each time the first FET 308 is switched off, the voltage induced across the second inductor coil 206 reverse biases the intrinsic diode 312d of the second FET 312, and that when the second inductor coil 206 is being operated, each time the second FET 312 is switched off, the voltage induced across the first inductor coil 204 reverse biases the intrinsic diode 308d of the first FET 308. As in the case of the circuit 300, in the example of the controller 318 repeatedly switching the first FET 308 on and off to cause the first inductor coil 204 to heat the susceptor 202, each time the first FET 308 is switched off, a positive voltage is generated at the first end 204a of the first inductor coil 204. However, in contrast to circuit 300, in circuit 500 a corresponding smaller positive voltage is induced at the second end 206b (instead of the first end 206a as is the case for circuit 300) of the second inductor coil 206 due to magnetic coupling. Since in circuit 500, the second end 206b of the second inductor coil 206 connects to the drain terminal 312 of the second FET 312, each time the first FET 308 is switched off, the second FET 312 is reverse biased. Hence current is substantially prevented from flowing through the second FET 312. Conversely, when the controller 318 repeatedly switches the second FET 312 on and off to cause the second inductor coil 206 to heat the susceptor 202, each time the second FET 312 is switched off, the first FET 308 becomes reverse biased in a similar manner, and hence current is substantially prevented from flowing through the first FET 308. Thus, although in circuit 500 the inductor coils 204,206 are physically wound in the same sense, the circuit 500 provides the advantages mentioned above with respect to the circuit 300 by having the inductor coils 204,206 connected to the circuit in a way such that a substantial current is prevented from flowing in the inactive inductor coil.

However, the topology of the circuit 500 may require a more difficult printed circuit board layout with high current traces. In some examples, the simpler topology of the circuit 300 may be preferred.

Figure 6:
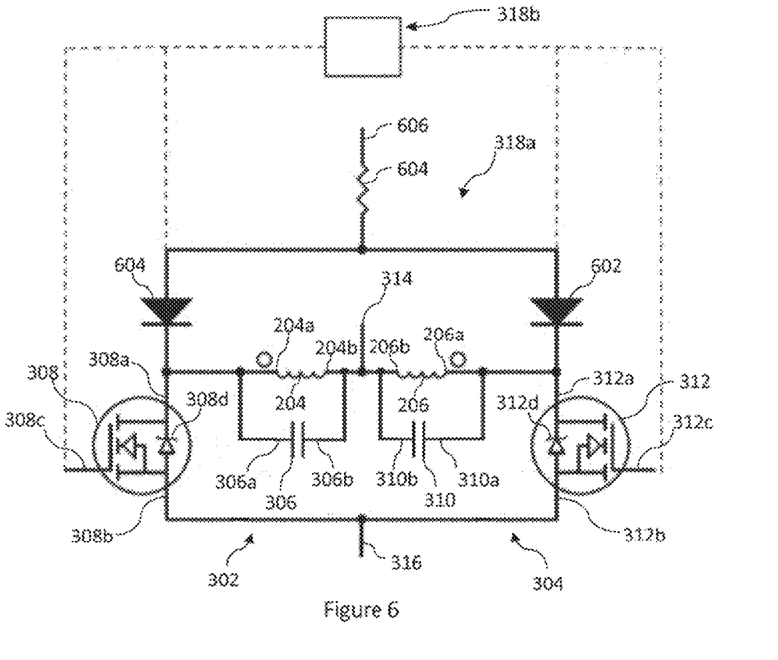
FIG. 6 is a diagram of the first circuit shown in FIG. 3 schematically shown connected to additional circuitry.

Referring now to FIG. 6, an example controller 318a, 318b for controlling the circuit 300 of FIG. 3 will be described. In FIG. 6, the circuit 300 of FIG. 3 is reproduced except that the controller 318 is represented as two different sections, namely, a zero voltage detector section 318a and a switching section 318b, and that an example heater arrangement 103 is not shown connected to the circuit.

When one of the first 308 and second 312 FETs is being repeatedly switched on and off, as described above with respect to FIG. 3, to operate a respective one of the first 204 and second 206 inductor coils, the zero voltage detector section 318a detects when, after the respective FET has been switched off, the voltage across that FET has returned to zero (e.g. point 400e in FIG. 4) or, is close to zero, and in response to the zero voltage detector section 318a making this detection, the switching section 318b switches the respective FET on again.

The switch controller section 318a is a zero voltage detection circuit comprising first 600 and second 602 small signal diodes, a pull up resistor 604, and a logic power source 606. Taking the example of the second inductor coil 206 being operated to heat the susceptor 202, the functioning of the switch controller section 318a, will now be described.

When the second inductor coil 206 is being operated to heat the susceptor 202, the first FET 308 remains off. When the first FET 308 remains off, the first small signal diode 600 has either no bias or is reverse biased depending on the voltages at the logic power source 606 and the power supply connection 314, that is, the voltage at the cathode end of the first small signal diode 600 is either substantially the same as or higher than the voltage at the anode end of the first small signal diode 600.

During the switching at the switching rate of the second FET 312, when the second FET 312 is off and the voltage across it varies as indicated by 4b-d of FIG. 4, the second small signal diode 602 is reversed biased. At the end of this variation in voltage, when the voltage reaches 0V as indicated by 400e, or is close to 0V, the second small signal diode 602 becomes forward biased. The second switch controller section 318b, in this example, includes one or more flip-flop means (not shown) that can be set to switch the first and second FETs 308 and 318 on or off. Accordingly, when the second small signal diode 602 is forward biased at 400e, the signal from the second small signal diode 602 is provided to a flip-flop means (not shown) included in the second switch controller section 318b in order to set it to switch the second FET 312 on. When the second FET 312 is on, the second small signal diode 602 is reverse biased.

As already described above with reference to the FIG. 3 circuit, the second FET 312 remains on until a required amount of energy is stored in the associated inductor coil 206. In this example, the magnitude of the current flowing in the second inductor coil 206 may be measured by suitable current measuring means (not shown) that may be included in the second switch controller means 318b. Once the magnitude of the current in the second inductor coil 206 is at a level corresponding to the desired amount of energy being stored in the second inductor 206, the flip-flop is reset in order to switch the second FET 312 off and initiate another variation of the voltage 400g across the first capacitor 310.

In one particular example, the logic power source 606 provides a voltage of 2.5V, and the signal from the second small signal diode 602 is provided to the flip-flop means mentioned above included in the second switch controller section 318b. The flip-flop means switches at half of the voltage of the logic power source 606, that is, at 1.25V in this example. This means that the forward bias voltage of the second small signal diode 602 and the voltage at the second FET 312 drain must sum to 1.25V in order that the digital logic circuit turns the second FET 312 on. In this example therefore, the second FET 312 is switched on when its drain 312a is at 0.55V rather than at 0V as referenced above. It should be noted that ideally, switching should occur at 0V across the FET 312 for maximum efficiency. This zero voltage switching advantageously prevents the second FET 312 from discharging the second capacitor and thereby wasting energy stored in the second capacitor 310.

However, the loss in efficiency due to the use of this digital logic circuit as opposed to, for example, an analogue comparator circuit can be thought to be offset by the advantageous saving in circuit parts and cost. In this example 0.55V is an acceptable voltage across the second FET 312 at which to switch the second FET 312 back on.

It should be noted that in this example, the zero voltage switching as described above occurs in steady state conditions, that is, when the repeated switching of the second FET 312 is ongoing. In order to commence operation of the second inductor coil 206 by commencing the repeated switching of the second FET 312, an additional signal may be provided to the second FET 312.

Although in the above description the functioning of the zero voltage detection circuit 318a is described in relation to controlling switching of the second FET 312, it will be understood that the zero voltage detection circuit 318a functions in the same way, using the first small signal diode 600 instead of the second small signal diode 602, to control the first FET 308.

It will be appreciated that the first and second inductor coils 204,206, in some examples, may have at least one characteristic different from each other. For example, the first inductor 204 may have at least one characteristic different from the second inductor coil 206. More specifically, in one example, the first inductor coil 204 may have a different value of inductance than the second inductor coil 206. In another example, the first and second inductor coils be different lengths such that the first inductor coil 204 is wound over a larger section of the susceptor 202 or vice versa. In another example, the first inductor coil 204 may comprise a different number of turns than the second inductor coil 206. In yet another example, the first inductor coil 204 may be composed of a different material to the second inductor coil 206. It is envisaged that the first inductor coil 204 may have one or more different characteristics to the second inductor coil 206 based on, for example, how the smokable material within the volume of the susceptor is desired to be heated. In some examples, the first and second inductor coils 204 and 206 may be substantially identical.

The above examples have been described with the circuits 300 and 500 comprising N-channel FETs. However, in some examples, circuits comprising P-channel FETs may be used instead. For example, P-channel FETs may be used in circuit 300 if the connection 314 shown in FIG. 3 is instead connected to the negative terminal of the power source 108, and the connection 316 is instead connected to the positive terminal of the power source 108.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilized and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

The invention claimed is:

1. A control circuit for use with a device for heating smokable material to volatilize at least one component of said smokable material, the control circuit comprising:
   at least a first inductor coil and a second inductor coil, the first inductor coil for generating a first varying magnetic field for heating a first section of a susceptor arrangement and the second inductor coil for generating a second varying magnetic field for heating a second section of the susceptor arrangement,
   wherein:
   the control circuit is for controlling the first inductor coil and the second inductor coil, wherein, the control circuit is configured so that when one of the first and second coils is actively being driven to generate a varying magnetic field the other of the first and second inductor coils is inactive and wherein the control circuit is configured so that the inactive one of the first and second inductor coils is prevented from carrying a current induced by the active one of the first and second inductor coils sufficient to cause significant heating of a susceptor arrangement.

2. A control circuit according to claim 1, wherein the first inductor coil is arranged to form part of a first resonator part of the control circuit, and the second inductor coil is arranged to form part of a second resonator part of the control circuit.

3. A control circuit according to claim 2, wherein the first and second resonator parts of the control circuit are LC resonator parts each further comprising at least a first and a second capacitor respectively.

4. A control circuit according to claim 2, wherein the control circuit further comprises a first switch in the first resonator part of the control circuit and a second switch in the second resonator part of the control circuit and wherein the control circuit turns the first switch on and off at a first switching rate to supply power from a power supply to the first coil to heat the susceptor when the second switch remains off, and the control circuit turns the second switch on and off at a second switching rate to supply power from the power supply to the second coil to heat the susceptor when the first switch remains off.

5. A control circuit according to claim 4, wherein the first switch is a first field effect transistor and the second switch is a second field effect transistor.

6. A control circuit according to claim 5, wherein the first FET acts as a first diode when off and the second FET acts as a second diode when off and wherein a phasing of the first and second inductor coils with respect to each other is arranged such that when the first inductor coil is being driven to heat the susceptor arrangement, a voltage induced in the second inductor coil by the first inductor coil puts the second diode in reverse bias to prevent current sufficient to cause significant heating of the susceptor arrangement from flowing in the second inductor coil, and when the second inductor coil is being driven to heat the susceptor arrangement, a voltage induced in the first inductor coil by the second inductor coil puts the first diode in reverse bias to prevent current sufficient to cause significant heating of the susceptor arrangement from flowing in the first inductor coil.

7. A control circuit according to claim 6, wherein the first inductor coil and the second inductor coils are wound in opposite directions around the susceptor arrangement.

8. A control circuit according to claim 6, wherein the first inductor coil and the second inductor coils are wound in the same direction around the susceptor arrangement.

9. A control circuit according to claim 4, wherein the control circuit is arranged so that when it turns the first switch on and off at the first switching rate, each time it turns the first switch on a voltage across the first switch is or is close to zero and that when it turns the second switch on and off at the second switching rate, each time it turns the second switch on a voltage across the second switch is or is close to zero.

10. A control circuit according to claim 9, wherein the control circuit comprises a zero voltage detector arrangement for detecting when the voltage across the first switch or the second switch is or is close to zero.

11. A control circuit according to claim 1, wherein the first inductor coil has at least one characteristic different from the second inductor coil.

12. An aerosol provision device for providing an inhalable aerosol, the device comprising:
the control circuit according to claim 1.

13. An aerosol provision device according to claim 12 further comprising a mouthpiece.

* * * * *